United States Patent
Tang et al.

(10) Patent No.: US 12,519,541 B2
(45) Date of Patent: Jan. 6, 2026

(54) DEVICE AND METHODS FOR REAL-TIME POLARIZATION-DEPENDENT LOSS MONITORING AT COHERENT TRANSCEIVERS

(71) Applicant: HUAWEI TECHNOLOGIES CO., LTD., Shenzhen (CN)

(72) Inventors: Xuefeng Tang, Kanata (CA); Ge Gao, Boulogne Billancourt (FR); Jianwu Wang, Shenzhen (CN); Zhiping Jiang, Kanata (CA); Zhuhong Zhang, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 262 days.

(21) Appl. No.: 18/498,614

(22) Filed: Oct. 31, 2023

(65) Prior Publication Data

US 2024/0106533 A1    Mar. 28, 2024

Related U.S. Application Data

(63) Continuation of application No. PCT/CN2021/108582, filed on Jul. 27, 2021.

(51) Int. Cl.
| | |
|---|---|
| *H04B 10/00* | (2013.01) |
| *H04B 10/077* | (2013.01) |
| *H04B 10/079* | (2013.01) |
| *H04B 10/294* | (2013.01) |
| *H04B 10/61* | (2013.01) |
| *H04J 14/00* | (2006.01) |

(52) U.S. Cl.
CPC ... *H04B 10/0775* (2013.01); *H04B 10/07953* (2013.01); *H04B 10/2942* (2013.01); *H04B 10/616* (2013.01)

(58) Field of Classification Search
CPC ............. H04B 10/616; H04B 10/6162; H04B 10/6163
See application file for complete search history.

(56) References Cited

U.S. PATENT DOCUMENTS

| | | | |
|---|---|---|---|
| 2016/0241341 A1* | 8/2016 | Endo | H04B 10/6162 |
| 2020/0195354 A1* | 6/2020 | Perin | H04L 27/227 |

FOREIGN PATENT DOCUMENTS

| | | |
|---|---|---|
| CN | 106688199 A | 5/2017 |
| WO | 2014060031 A1 | 4/2014 |

* cited by examiner

*Primary Examiner* — Daniel G Dobson

(57) ABSTRACT

Device and methods for real-time polarization-dependent loss monitoring at coherent transceivers. In one embodiment, there is provided a method of monitoring a polarization dependent loss (PDL) of a signal during transmission through an optical communication link, the method comprising: receiving the signal by a coherent receiver, the received signal being subjected to one or more impairments in Amplifier Gain Control (AGC) mode, the one or more impairments including PDL; estimating an AGC gain effect of the AGC mode; compensating for the AGC gain effect in the received signal; determining the PDL from the compensated signal; and reporting the PDL.

20 Claims, 9 Drawing Sheets

DEVICE AND METHODS FOR REAL-TIME POLARIZATION-DEPENDENT LOSS MONITORING AT COHERENT TRANSCEIVERS

RELATED APPLICATION DATA

The present application is a continuation of international PCT patent application no. PCT/CN2021/108582, filed Jul. 27, 2021, the content of which is incorporated herein by reference.

TECHNICAL FIELD

The present application relates to optical communication networks, and in particular device and methods for detecting and monitoring polarization-related optical impairments in coherent optical systems.

BACKGROUND

In optical telecommunication systems, coherent optical transceivers (also called coherent transceivers) are used to transmit optical signals by modulating the amplitude and phase of light transmitted through an optical channel, such as a fiber optic cable, or to receive optical signals and apply suitable demodulation to extract the original transmitted signal.

During transmission, coherent optical transceivers are used to generate and transmit optical signals by modulating the amplitude and phase, of light transmitted through an optical channel, such as a fiber optic cable. For example, amplitude and phase modulation may be carried out as quadrature amplitude modulation (QAM) on each of two polarizations (X, Y) of an optical carrier to achieve polarization multiplexing. One technique for coherent transmission involves using four separate electrical data channels to modulate four modulation components of the optical signal: an in-phase modulation component (I) and a quadrature modulation component (Q) for a horizontal X-direction polarization (X), and a vertical Y-direction polarization (Y) respectively. The four channels are: an XI channel encoding in-phase modulation of the X-direction polarization; an XQ channel encoding quadrature modulation of the X-direction polarization; a YI channel encoding in-phase modulation of the Y-direction polarization and a YQ channel encoding quadrature modulation of the Y-direction polarization.

During transmission, the optical signal in an optical network may be transmitted through additional components of the network, such as optical amplifiers (e.g., erbium-doped fiber amplifier (EDFA)), optical couplers, filters, isolators, and multiplexer/de-multiplexer, etc., as part of the optical channels (or links), such as fiber optic cables, connecting the components. However, the components and the optical fibers of the optical channel or link may introduce unwanted polarization-related optical impairments as the optical signal is transmitted through the optical network. The polarization-related optical impairments, also known as polarization-dependent impairments, may include polarization dependent loss (PDL), polarization dependent dispersion (PMD), and cross-polarization modulation (XPolM). The impact of such effects on the system depends on the incident state of polarization (SOP) of each optical signal and may cause severe performance degradation of the optical signal.

In particular, the amount of PDL that accumulates along the transmission path or transmission link (i.e. link PDL or "PDL" for the remainder of this disclosure), its instant value is subject to a Maxwellian distribution and could be larger than 3.0 dB over the entire transmission link. Hence, PDL has been recognized as a major impairment for coherent transmission systems as it could manifest itself in degradation of the optical signal-noise-ratio (OSNR) of the polarization-multiplexed signals and cause cross-talk between the two polarization states. PDL monitoring is a key function for optical performance monitoring (OPM) to predict the system operation margin and to diagnose and identify the network failures. Often, system margins are reserved to accommodate for PDL at the expense of transmission capacity such as spectral efficiency and transmission distance. Without accurate PDL information, margins are often reserved in excess to avoid transmission failure. Hence, attempts have been made to detect PDL which may permit more accurate system margin assignment, and hence more efficient transmission capacity utilization.

Various approaches to PDL detection and monitoring have been made in research literature. In "*Optical Performance Monitoring in Digital Coherent Receivers*" by Fabian. N. Hauske et al, JLT, Vol. 27. No. 16, pp. 3623-3631, 2009, the disclosure of which is incorporated herein in its entirety, the authors propose a link channel modelled as a 2×2 transfer function, including PDL, PMD, and SOP, which is obtained from adaptive coefficients of a 2×2 MIMO filter at receiver DSP. The PDL may be calculated from the Eigen value of a 2×2 Hermitian matrix of the transfer function at the carrier frequency. However, the PDL determined from the adaptive MIMO coefficients may not reflect the actual channel PDL when the coherent receiver is operating in Amplifier Gain Control (AGC) mode, in which the power difference induced by the PDL may be compensated by the AGC and hence affects the PDL value extracted from the 2×2 MIMO coefficients.

In another research paper, namely "*Two-Stage Constant Modulus Algorithm Equalizer for Singularity Free Operation and Optical Performance Monitoring in Optical Coherent Receiver*", C. Xie et al., OFC 2010, paper OMK3, the authors propose a polarization division multiplexing (PDM) coherent communication system with a two-stage constant modulus algorithm (CMA) equalizer where PDL is calculated from the powers output from the second stage of the equalizer $H_2$ and the input SOP states at the input. This method, similar to the adaptive method described above, both are based on eigenvalue derived from channel transfer matrix. Hence, the reported results may be prone to a noticeable PDL measurement background, which cannot be removed by measurement averaging.

Another known method of determining PDL within an optical network is the covariance matrix method, in which the PDL is calculated before MIMO convergence. Specifically, an optical signal is sampled directly after coherent detection and represented as a received data covariance matrix. After removing the amplified spontaneous emission (ASE) channel noise from the sampled data by subtracting a ASE noise covariance matrix from the received data covariance matrix, the eigenvalues of the resulting covariance matrix may be used to calculate, such as by singular vector decomposition (SVD), the PDL of the system. This method has a strong SOP dependency due to AGC effects. Moreover, a pilot tune containing redundancy data is added into the data frame for OSNR monitoring, which increases the overhead and decreases spectral efficiency.

Therefore, systems and methods for accurately detecting the polarization-related optical effects such as PDL are desired to improve performance, such as bit-error rate (BER), of a signal in an optical network.

SUMMARY

The present disclosure describes an example method and apparatus for estimating a PDL of an optical channel or link through which a signal is transmitted from a transmitter to a receiver. The transmitter and receiver may be separate units or components of a single transceiver. The optical link may comprise one or more network components such as amplifiers, isolators, couplers, and filters, which introduce undesired polarization-dependent signal gain (PDG), or loss (PDL), to the transmitted signal which may cause inaccuracies in the signal recovery by the receiver.

The present disclosure provides methods and apparatuses for determining a PDL vector by vectorially summing a PDL vector extracted from the MIMO coefficients of a 2×2 MIMO equalizer and an AGC PDL vector modelled by the AGC gain. The 2×2 MIMO equalizer may be implemented in time domain (referred to as time-domain MIMO or TDMIMO) or in frequency domain (referred to as frequency domain MIMO or FDMIMO). Embodiments of the present disclosure may be shown and described as having a FDMIMO, but the use of FDMIMO is not intended to be limiting. The method described here may be applied to both time and frequency MIMO. The methods and apparatuses described herein may be capable of more accurately monitor the PDL by a receiver DSP and being less prone to channel SOP rotational effects as result of AGC.

The present disclosure provides one exemplary method of monitoring a PDL whereby the PDL compensated by the FDMIMO (referred to as FDMIMO PDL) is determined vectorially with a direction and a magnitude. The PDL transfer matrix (or operator) is characterized by (or redefined as)

$$P = e^{-\alpha/2} \exp\left(\frac{\vec{\alpha}\vec{\sigma}}{2}\right),$$

where $\vec{\alpha}$ is the PDL vector which is a 3×1 vector in the Stokes Space, and $\vec{\sigma}$ is the Pauli vector. The PDL vector is defined as: $\vec{\alpha} = \alpha \vec{s}$, where the vector amplitude $\alpha$ is the differential attenuation between polarization modes at the maximum and minimum transmittance, which is related to the PDL value (in dB scale) by $$PDL(\text{dB}) = \alpha \frac{20}{\ln 10}, \vec{s}$$

is an 3×1 unit vector in the Stokes space pointing to the maximum transmission direction. The PDL vector can be extracted from a Hermitian matrix which is constructed from the normalized FDMIMO transfer matrix. In one exemplary embodiment, the AGC PDL vector is determined by an AGC estimation method. Specifically, the SOP rotation matrix, which rotates the receiver axis respective to transmitter axis, may be extracted from the coefficients of the FDMIMO. The SOP rotation matrix is represented by a rotation angle Ψ and rotation vector r̂. The AGC PDL vector respective to transmitter axis may be calculated as $\vec{P2} = \exp(\Psi \hat{r} \times) \vec{P1}$, where $\vec{P1}$ is the AGC PDL vector respective to receiver axis, which is pointing to the polarization direction with the maximum AGC gain of the coherent receiver. The AGD PDL transfer matrix is defined to be $$PDL_{AGC} = \begin{bmatrix} 1 & 0 \\ 0 & \exp(\Delta g) \end{bmatrix},$$

where $\Delta g$ is the AGC gain ratio between X and Y polarizations of the coherent receiver. Without loss of generality, the AGC gain at X-pol is assumed to be larger than that at Y-pol.

In another embodiment, the PDL is determined by a covariance matrix method. Specifically, the impact of PDL effect caused by AGC gain is removed by multiplexing a reversed AGC transfer function to sampled digital signals. The AGC gain effect and the covariance matrix of ASE noise, which may be determined by calculating the OSNR from the ratio between the noise variance and signal power, are removed from a covariance matrix of received signal. The PDL vector may then be calculated from the Eigen values of the resulting covariance matrix. The covariance matrix method may advantageously remove SOP dependency induced by AGC effects and thereby enhance estimation reliability.

In another embodiment, it discloses a method of monitoring a link polarization dependent loss (PDL) of a signal during transmission through an optical communication link, the method comprising: receiving the signal by the coherent receiver, the received signal is subjected to one or more impairments including PDL in Amplifier Gain Control (AGC) mode; estimating an AGC gain effect of the AGC mode; correcting for the AGC gain effect in the received signal; determining the PDL from the compensated received signal; and reporting the PDL.

Optionally, wherein the estimating step further comprises: determining an Amplifier Gain Control (AGC) PDL vector from the received signal; determining a MIMO PDL vector from a multiple input multiple output (MIMO) equalizer that models the one or more impairments of the optical communication link from the received signal; and vectorially summing the AGC PDL vector and the MIMO PDL vector to derive a PDL vector.

Optionally, wherein the determining the PDL further comprises: calculating the PDL as a vector equal in magnitude but opposite in vector direction to the derived PDL vector.

Optionally, wherein the determining the MIMO PDL vector further comprises: determining a PDL transfer matrix of the MIMO equalizer; redefining the PDL transfer matrix as in the form of $$P = e^{-\alpha/2} \exp\left(\frac{\vec{\alpha}\vec{\sigma}}{2}\right),$$

where $\vec{\alpha}$ is a PDL vector defined as $\vec{\alpha} = \alpha \vec{s}$, $\alpha$ is a vector amplitude indicative of differential attenuation between polarization modes at minimum and maximum transmittance, $\vec{s}$ is an unit vector in Stokes space pointing in a direction of maximum PDL transmission, $\vec{\sigma}$ is a Pauli vector; and calculating a direction and magnitude of the MIMO PDL vector from a Hermitian matrix of the PDL transfer matrix.

Optionally, wherein the determining of the AGC PDL vector further comprises: determining an AGC transfer function of a signal gain of the received signal; determining a channel state of polarization (SOP) rotation matrix from the AGC transfer matrix of the MIMO equalizer; calculating a magnitude of the AGC PDL vector from Eigen values of the AGC transfer matrix; and calculating a direction of the AGC PDL vector from the channel SOP rotation matrix.

Optionally, wherein the determining of the channel SOP rotation matrix further comprises calculating the channel SOP rotation matrix coefficients by performing singular value decomposition (SVD) method on MIMO coefficients of the MIMO equalizer.

Optionally, the method further comprising adjusting a reserved system margin in response to the reported PDL.

Optionally, wherein the calculating further comprises: extracting the PDL transfer matrix of the MIMO equalizer coefficients; evaluating the normalized transfer matrix at direct current (DC) conditions; and converting the evaluated normalized DC transfer matrix to a Hermitian matrix as:

$$M = W_{UE}(W_{UE})^H = V\begin{pmatrix} 1 & 0 \\ 0 & e^{-2\alpha} \end{pmatrix}V^H$$

Where $W_{UE}$ is the normalized transfer function, $(W_{UE})^H$ is its conjugate matrix, V is a rotation matrix that characterizes polarization rotation between the received signal and the PDL axis, $\alpha$ is the differential attenuation at polarization modes (polarization direction corresponding to maximum minimum transmittance) related to the MIMO PDL value in dB scale by PDL=

$$PDL = \alpha \frac{20}{\ln 10},$$

and VH is the conjugate matrix of V.

Optionally, the method further comprising applying a logarithmic matrix operator to the PDL vector in Stokes space as:

$$B = \log_m\left[\frac{M}{2}\right] = \begin{bmatrix} B_{11} & B_{12} \\ B_{21} & B_{22} \end{bmatrix},$$

where $B_{11}$, $B_{12}$, $B_{21}$, and $B_{22}$ are coefficients of the Stokes space matrix; and determining the vector direction of the PDL AGC vector as $$\vec{\alpha} = [\alpha_1 \ \alpha_2 \ \alpha_3]^T$$

where $\alpha_1 = \frac{B_{11} - B_{22}}{2}, \alpha_2 = \frac{B_{21} + B_{12}}{2}, \alpha_3 = \frac{B_{21} - B_{12}}{2j}$, with $j = \sqrt{-1}$.

Optionally, wherein the determining the PDL (in dB scale) from the magnitude of the AGC PDL vector is as:

$$PDL(dB) = 20\log_{10}\left(e^{\sqrt{\alpha_1^2 + \alpha_2^2 + \alpha_3^2}}\right).$$

Optionally, wherein $\alpha$ is related to the PDL value in dB by $$PDL(dB) = \alpha \frac{20}{\ln 10}.$$

Optionally, wherein the estimating of the AGC gain effect further comprises: sampling the received signal prior to Digital Signal Processing (DSP) unit; retrieving AGC gain values from the sampled signal; determining an AGC gain matrix from the AGC gain values; and determining an AGC transfer function from the AGC gain matrix.

Optionally, wherein the compensating further comprises: determining a signal matrix by multiplexing an inverse of the AGC transfer function to the sampled received signal; and calculating a covariance matrix by subtracting an amplified spontaneous emission (ASE) noise variance from the signal matrix.

Optionally, wherein the determining the PDL further comprises: determining a PDL value from Eigen values of the covariance matrix.

Optionally, further comprising calculating an Optical Signal Noise Ratio (OSNR) from a ratio between the ASE noise variance and the received signal variance.

In another embodiment, it discloses a coherent receiver configured to monitor a link polarization dependent loss (PDL) of an optical communication link a received signal is subjected to during transmission through the optical communication link, the coherent receiver comprises:
 a front end portion for receiving the received signal;
 a PDL monitoring module that is configured to:
  estimate an AGC gain effect of the received signal,
  compensate the received signal with the estimated PDL, and determine the PDL from the compensated signal.

Optionally, wherein the PDL monitoring module further comprises:
 a MIMO PDL vector calculator configured to determine a transfer matrix of a multiple input multiple output (MIMO) equalizer that models the one or more impairments of the optical communication link; defining a PDL transfer matrix as $$P = e^{-\alpha/2}\exp\left(\frac{\vec{\alpha}\vec{\sigma}}{2}\right),$$

where $\vec{\alpha}$ is a PDL vector defined as $\vec{\alpha} = \alpha\vec{s}$, $\alpha$ is the vector amplitude indicative of a differential attenuation between polarization modes at minimum and maximum transmittance, $\vec{s}$ is an unit vector in Stokes space pointing in a direction of maximum PDL transmission, $\vec{\sigma}$ is a Pauli vector; calculate a direction and magnitude of a MIMO PDL vector using coefficients of the Hermitian matrix converted from the Hermitian matrix of a normalized MIMO transfer matrix; an AGC PDL vector calculator configured to calculate an AGC PDL vector from a SOP rotation matrix determined from the MIMO transfer matrix; a PDL vector summation module configured to vectorially sum the MIMO PDL vector and the AGC PDL vector as the system PDL; and a PDL calculator configured to report the PDL.

Optionally, wherein the MIMO is one of a FIR filter bank configured in a butterfly configuration, a 2×2 frequency domain (FD) MIMO, and a 2×2 time domain (TD) MIMO.

Optionally, wherein the PDL monitoring module further comprises a SOP rotation matrix calculator configured to calculate the SOP rotation matrix using SVD method.

Optionally, wherein the PDL monitoring module further comprises: a covariance matrix calculator module configured to calculate the covariance matrix from the received signal, and construct a AGC transfer matrix from the AGC gain register, and compensate the AGC effect by multiplying the AGC gain matrix to the covariance matrix of the received data; a noise estimator configured to determine a variance of a channel noise; the noise variance is subtracted from the covariance matrix to remove the impact of ASE noise power on the PDL estimation accuracy. A PDL calculator configured to calculate the PDL from Eigen values of a resulting covariance matrix derived from removing the channel noise from the AGC covariance matrix.

BRIEF DESCRIPTION OF THE DRAWINGS

Reference will now be made, by way of example, to the accompanying figures which show example embodiments of the present application, and in which.

Like reference numerals are used throughout the Figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Separate boxes or illustrated separation of functional elements or modules of illustrated systems and devices does not necessarily require physical separation of such functions or modules, as communication between such elements can occur by way of messaging, function calls, shared memory space, and so on, without any such physical separation. As such, functions or modules need not be implemented in physically or logically separated platforms, although they are illustrated separately for ease of explanation herein. Different devices can have different designs, such that while some devices implement some functions in fixed function hardware, other devices can implement such functions in a programmable processor with code obtained from a machine readable medium.

As used here, a "module" can refer to a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, an application specific integrated circuit (ASIC), field programmable gate array (FPGA), or a system on a chip (SoC) or another hardware processing circuit.

In examples disclosed herein, methods and apparatuses are described that provide real-time monitoring of Polarization Dependent Loss (PDL) based on DSP in a coherent transceiver. To assist in understanding the present disclosure, FIG. 1 is first described.

Figure 1:
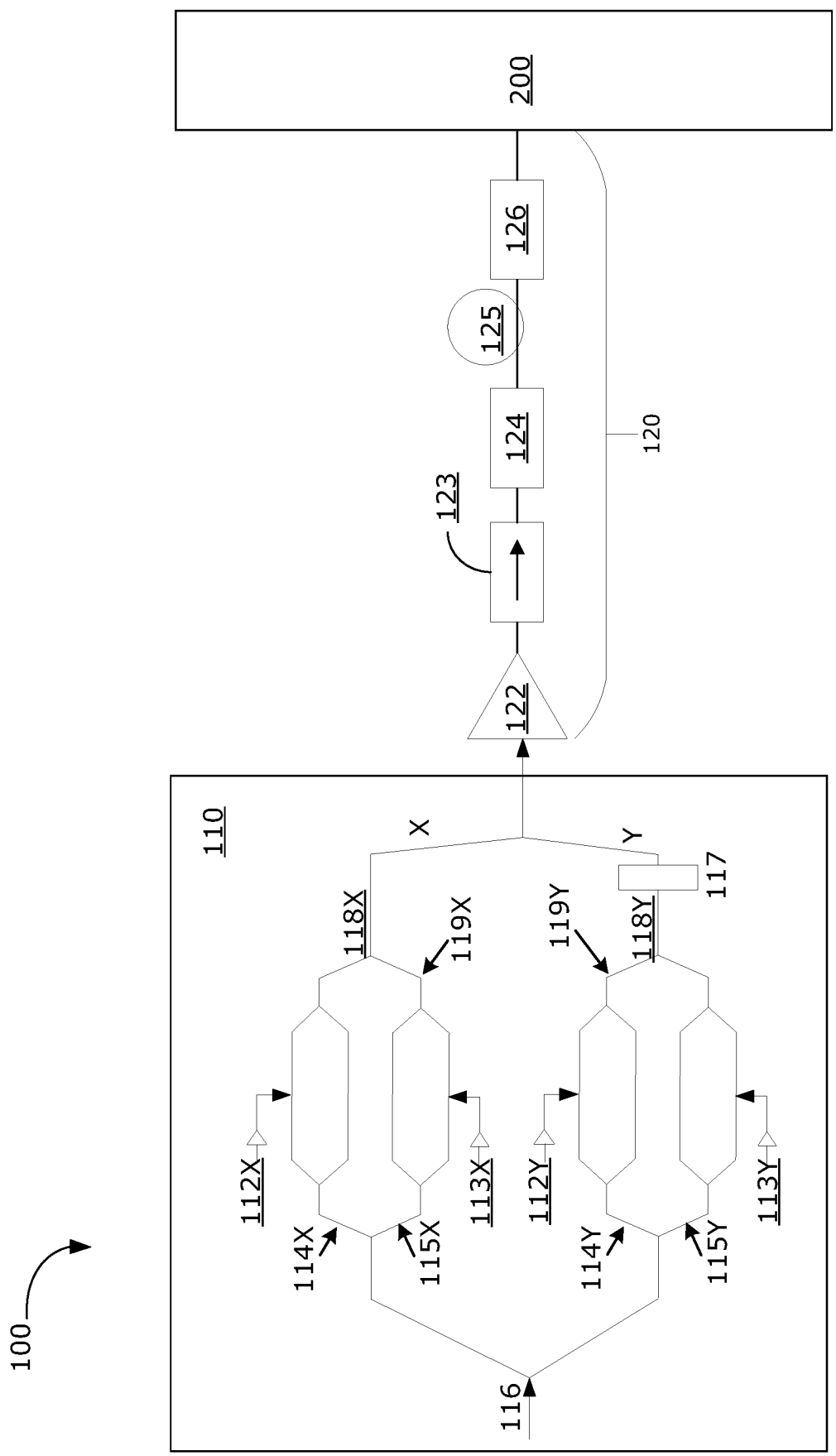
FIG. 1 illustrates an example optical network having at least one optical transmitter and at least one optical receiver in accordance with example embodiments.

FIG. 1 illustrates an example optical network 100 in which optical transmitters and receivers are used to generate, transmit and receive an optical signal, in accordance to example embodiments. The optical network 100 includes one or more optical transmitters 110 that transmit signals, through an optical channel 120, to one or more optical receivers 200. The transmitter 110 generates, from a respective data stream, an optical signal that is defined by a sequence of regular units in time domain. As will be discussed further below, each unit of the transmitted signal is associated with a respective SOP. The unit may be a frame, a symbol, a sub-frame or multiple frames of the signal, for example. It is understood that although a single instance of transmitter 110, optical channel 120, and receiver 200 are shown, there may be multiple instances of each in a network 100.

In transmitter 110, an input signal undergoes IQ modulation at X and Y polarization directions which may be performed using parallel electro-optical modulator (EOM), such as an IQ Mach-Zehnder Modulator (IQ-MZM), or other suitable optical modulator. At each polarization, an in-phase (I) channel path is modulated by an analog electrical data I channel and a quadrature (Q) channel path is modulated by an analog electrical data Q channel.

As shown, an optical carrier input 116 is received, for example in the form of a laser providing a light source at a particular frequency (e.g., about 193 THz) also referred to as carrier frequency. The optical carrier input 116 is split into two polarization components, the first including I channel path 114X and Q channel path 115X and the second includes I channel path 114Y and Q channel path 115Y in accordance with optical interferometry techniques. The I paths 114X and 114Y, collectively referred to as I paths 114, each receives an analog electrical signal from the I channel 112X and 112Y, respectively, which modulates an I component of the optical carrier signal propagated through the I channel paths 114. The Q paths 115X and 115Y, collectively referred to as Q paths 115, each receives an analog electrical signal from the Q channel 113X and 113Y, respectively, which modulates a Q component of the optical carrier signal propagated through the Q channel paths 115. With an appropriate bias voltage applied to outer Mach-Zehnder (MZ) interferometers at X (119X) and Y (119Y) polarization paths, the Q paths 115X and 115Y experiences a phase shift of about 90° relative to the I path. The second polarization component signal is rotated, by a polarization rotator 117, from an X-polarization to a Y-polarization. The optical signal output of the I paths 114 and the optical signal output of the Q paths 115 are coupled or combined to form an optical signal outputs 118X and 118Y, collectively referred to as outputs 118 (which is the optical carrier modulated with the data). The signals at the outputs 118 are optical quadrature amplitude modulation (QAM) signals, where the descriptor "optical" indicates that the QAM signal is carried by an optical carrier. Because data information can modulated onto two polarizations (X- and Y-polarizations), the signals at the outputs 118 may also be referred to as polarization multiplexed (dual-polarization) optical signals. As shown, the input polarization state of output 118Y is rotated by polarization rotator 117 from X-polarization to its orthogonal, Y-polarization.

The output 118 is carried through optical channel 120. There are typically multiple components along the optical channel 120, some of which are illustrated in FIG. 1. The amplifier 122, such as an erbium-doped fiber amplifier (EDFA), amplifies the output signal 118 and generates an amplified signal. The isolator 123 permits optical signals to pass through in one direction thereby reducing the level of reflected light back into the amplifier. The optical coupler 124 may couple optical signals from one or more input optical channels into one or more output optical channels. The optical add-drop multiplexer (OADM) 126 comprises an add/drop module to add and/or drop optical signals to the amplified signal, to be carried over an optical channel, such as optical fiber 125. In embodiments where multiple transmitters 110 and multiple receivers 200 are used, there may be additional components such as transmitter side multiplexers and corresponding receiver side demultiplexers. One or more of the aforementioned components of the optical channel may be present or omitted in a network 100 depending on the need of the network.

At the receiver 200, the received optical signal is converted into an electrical signal by an optical coherent receiver, in order to recover the data on the I channel and on the Q channel along the X and Y polarizations The coherent receiver includes an integrated coherent receiver (ICR), analog-to-digital converters (ADCs), transimpedance amplifiers (TIA) and a digital signal processor (DSP) implementing equalization algorithms.

During transmission from the transmitter 110 to the receiver 200, the transmitter output 118 may suffer degradations attributed to PDL generally through components such as the optical amplifiers 122, optical isolators 123, and couplers 124, and other components such as filters. The polarization dependent effects may modify the polarization couplings along an optical channel, and may cause a transient change in the received power of a signal along two orthogonal polarization states. The PDL of an element is defined as:

$$PDL_{dB} = 10 \times \log_{10}\left(\frac{P_{Max}}{P_{Min}}\right)$$

where $PDL_{dB}$ is the PDL expressed in decibel scale, $P_{Max}$ is the output power of a signal when the signal in the minimum attenuation direction, and $P_{Min}$ is the output power when the signal in the maximum attenuation direction.

In some examples, the optical signal may be a dual-polarized optical signal. Four separate electrical data channels are used to modulate four modulation components of the optical signal, where the four orthogonal channels are the X-polarized I channel, X-polarized Q channel, Y-polarized I channel, and Y-polarized Q channel. That is, data is modulated on the I and Q components of each of two orthogonal polarization directions (X and Y) of the optical signal. This technique may be referred to as polarization-multiplexing optical modulation. At the receiver 200, the optical signal is converted back to an electrical signal using an optical coherent receiver, and separated into four separate channels from which the data is recovered. Typically, a 2×2 multiple-input multiple-output (MIMO) equalizer is implemented by the DSP at the receiver, to compensate for any channel impairments, such the rotation of polarization states and PDL.

Conventionally, the 2×2 MIMO equalizer separates the X- and Y-polarized signals from each other. However, in the presence of ASE noise, PDL may cause degradation of polarization orthogonality and exacerbate SNR differential between signal X and Y components, which may not be fully compensated by a typical 2×2 MIMO equalizer in the receiver DSP. Conventionally, excess system transmission margin are used to address the worst case scenario of the PDL effect based on the estimation model taking into account the link configuration such as the number of optical amplifiers, ROADMs, multiplexer and demultiplexer. However, the actual PDL probability distribution typically deviates from the estimation model and often the system transmission margin remain unused, leading to inefficient use of bandwidth.

Example methods and apparatuses described herein enable real-time estimation of the PDL by utilizing PDL vector summation, which may enable adjustment of system margin to effectively counter PDL while maximize system bandwidth. Further, examples described herein may take into account the effects of AGC thereby more accurately monitors PDL by being less SOP dependent.

Figure 2:
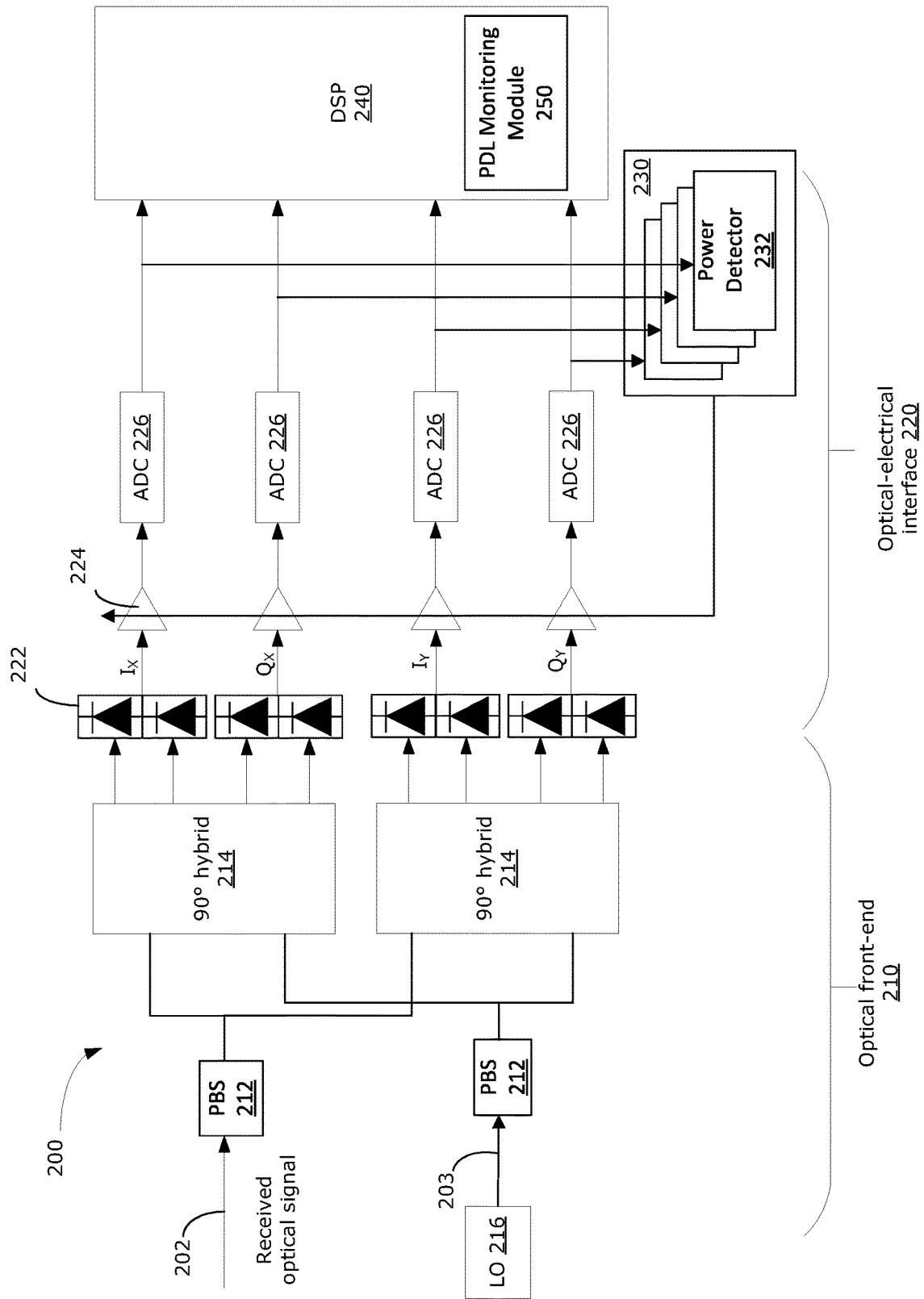
FIG. 2 is a block diagram of an example digital coherent receiver of FIG. 1 in accordance with the present disclosure.

FIG. 2 is a block diagram illustrating an example receiver 200 in which some examples described herein may be implemented. In particular, the receiver 200 is a digital coherent receiver, which includes an optical front-end 210, an optical-electrical interface 220 and a DSP 240.

The optical front-end 210 receives an optical signal 202, which may be subjected to channel impairments, including PDL, over an optical channel (e.g., optical fiber), and serves to separate the received optical signal into four branches (corresponding to the X- and Y-polarizations for each of the I and Q channels). Each of the separated optical signals may be mixed with a local oscillator (LO) signal 203 generated by a LO 216. The LO 216 may be a laser light source at the same wavelength as the signal carrier to perform coherent detection. The optical front-end 210 includes two polarization beam splitters (PBSs) 212, two 90° optical hybrids 214, and a LO 216. The PBSs 212 are configured to split the received signal 202 and LO signal 203 into the X- and Y-polarizations for each of the I and Q channels. The signals from the optical front-end 210 are provided to the optical-electrical interface 220. In the optical-electrical interface 220, a set of balanced photo detectors (BPDs) 222, such as balanced photo diodes, serves to detect each of the four optical signals and convert them to respective electrical signals. In some embodiments, the electrical signals following the BPDs 222 are photocurrents. The resulting electrical signals are amplified using a set of amplifiers 224, such as differential transimpedance amplifiers (TIAs). In some embodiments, the amplifiers are capable of converting photocurrents from BPDs 222 into voltages. A respective analog-to-digital converter (ADC) 226 receives the amplified electrical signals and performs signal sampling and quantization to output digital signals. Although multiple instances of the ADC 226 are shown, it is understood that all ADC's may be implemented within a single module.

In some embodiments, in order to minimize received power fluctuation and to stabilize the digital signal power to the DSP input, an AGC module 230 is implemented. In the illustrated embodiment, each of the four digitized signals are monitored by a respective power detector module 232 that is configured to monitor a power value, such as the root-mean-square (RMS) power value, of each of the digitized signals. The monitored power values are locked against a target power value through a feedback loop. The target power value may be set in the firmware. In some embodiments, the target power value may be dependent upon the quantization levels of the DSP 240. The signal gain or the difference between the monitored power value and the target power value generates an error signal, which is back propagated to the amplifiers 224 to adjust the amplification gain in order to minimize the error signal so that the digitized signal from ADC 226 closely reflect the target power value before entering DSP 240.

The digitized signal from the ADC 226, post AGC operation, is inputted to the DSP 240. The DSP 240 may be implemented using a customized ASIC chip, for example. The DSP 240 includes a PDL monitoring module 250 that implements algorithms to detect and monitor impairments introduced into the signal, including compensating for PDL. In particular, as discussed further below, in some example embodiments, the PDL monitoring module 250 determines a vector sum of a MIMO PDL vector and an AGC PDL vector in either ASIC or software that enables an estimation of the overall PDL value.

Figure 3:
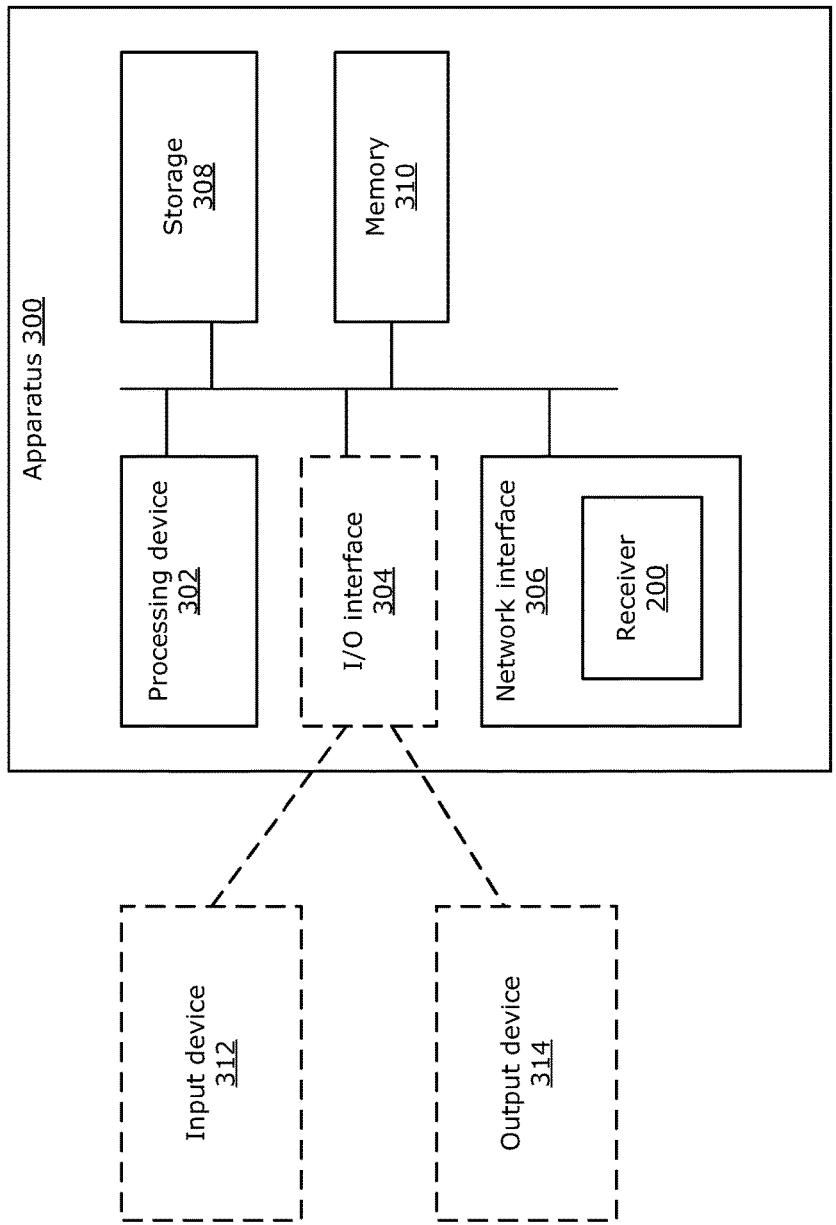
FIG. 3 is a block diagram of an example apparatus in which the receiver of FIG. 2 may be implemented.

FIG. 3 is a block diagram illustrating an example apparatus 300 in which the receiver 200 may be implemented. For example, the apparatus 300 may be an electronic device, a computing system, an access point (AP), a terminal device, etc. The apparatus 300 is configured for optical communications. Other communication devices suitable for implementing examples described in the present disclosure may be used, which may include components different from those discussed below. Although FIG. 3 shows a single instance of each component, there may be multiple instances of each component in the apparatus 300 and the apparatus 300 could be implemented using parallel and/or distributed architecture.

In this example, the apparatus 300 includes one or more processing devices 302, such as a processor, a microprocessor, an ASIC, a field-programmable gate array (FPGA), a dedicated logic circuitry, or combinations thereof. The apparatus 300 may also include one or more optional input/output (I/O) interfaces 304, which may enable interfacing with one or more optional input devices 312 and/or output devices 314. The apparatus 300 includes one or more network interfaces 306, including the receiver 200 for receiving an optical signal. The network interface(s) 306 may additionally include a transmitter (not shown) for transmitting an optical signal. The receiver 200 and transmitter may be implemented using an optical coherent transceiver.

The apparatus 300 includes one or more storage units 308, which may include a mass storage unit such as a solid state drive, a hard disk drive, a magnetic disk drive and/or an optical disk drive. The apparatus 300 also includes one or more memories 310, which may include a volatile or non-volatile memory (e.g., a flash memory, a random access memory (RAM), and/or a read-only memory (ROM)). The non-transitory memory(ies) 310 (as well as storage 308) may store instructions for execution by the processing device(s) 302. The memory(ies) 310 may include software instructions, such as for implementing an operating system (OS), and other applications/functions. In some examples, instructions may also be provided by an external memory (e.g., an external drive in communication with the apparatus 300) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Optional input device(s) 312 (e.g., a keyboard, a mouse, a microphone, a touchscreen, and/or a keypad) and optional output device(s) 314 (e.g., a display, a speaker and/or a printer) are shown as external to the apparatus 300, and connected to optional I/O interface 304. In other examples, one or more of the input device(s) 312 and/or the output device(s) 314 may be included as a component of the apparatus 300.

As mentioned above, the present disclosure describes examples for estimation and monitoring of system PDL using a vector sum of a MIMO equalizer PDL vector and an AGC PDL vector implemented in the receiver DSP 240. In particular, the MIMO equalizer may be implemented as a 2×2 MIMO finite impulse response (FIR) filter or a frequency domain equalizer. The coefficients (also referred to as filter taps) of the MIMO equalizer enables calculation of the SOP rotation vector of the optical channel 120, thereby further enabling calculation of the AGC PDL vector to the transmitter axis. The transmitter axes are aligned with the two orthogonal polarization directions, which are defined as X and Y directions. The AGC PDL vector may then be combined with the MIMO PDL vector to derive a more accurate estimation of the system PDL. The disclosed 2×2 equalizer-based calibration may be integrated on real-time chips or in the calibration software for in-service calibration, without the need for additional optical or electrical devices.

Figure 4:
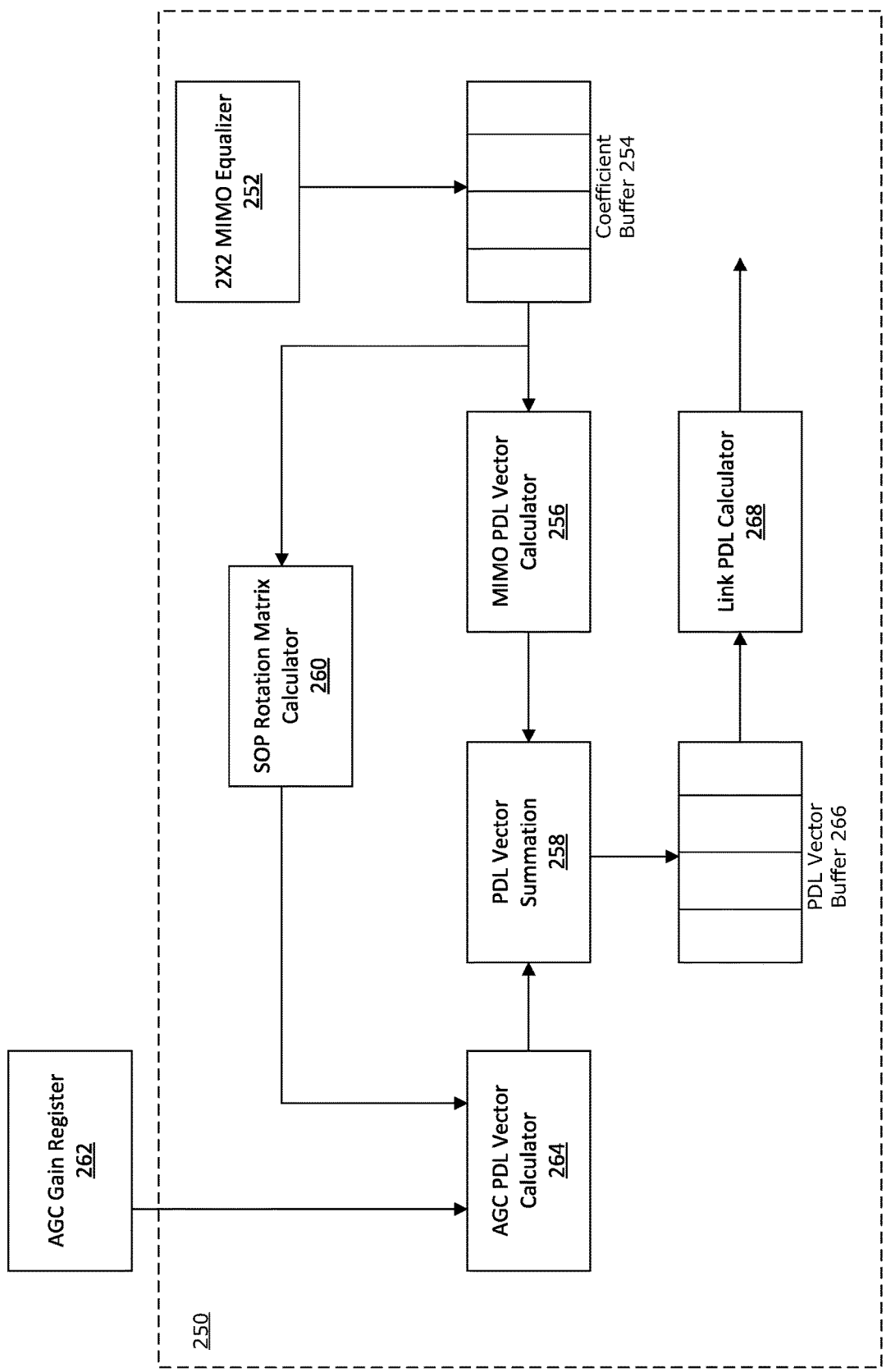
FIG. 4 is a block diagram illustrating some details of an example DSP in accordance with the present disclosure for estimating PDL using a PDL vector estimation method based on FDMIMO coefficients and AGC gain.

FIG. 4 shows one exemplary embodiment of the PDL monitoring module 250 in accordance with the present disclosure. Specifically, FIG. 4 shows an embodiment of the PDL monitoring module 250 that implements a "PDL vector summation" method. The PDL monitoring module 250 is shown to implement various example software sub-modules, such as a 2×2 MIMO equalizer coefficient register 252, MIMO coefficient buffer 254, 2×2 MIMO PDL Vector calculator 256, PDL vector summation 258, SOP rotation matrix calculator 260, AGC gain register 262, AGC PDL Vector calculator 264, PDL vector buffer 266, and PDL calculator 258. It should be understood that, although illustrated as individual blocks for ease of understanding, it should be understood that the functions of these modules may be implemented by the PDL monitoring module 250 as a single set of instructions.

A PDL vector based estimation method is employed where a FDMIMO PDL vector is calculated from the coefficients of the taps of an adaptive FDMIMO equalizer and the AGC PDL vector from the AGC gain, thereby converting any measurement background noise to uncertainties in vector direction and amplitude. The resulting FDMIMO PDL vector may significantly reduce the PDL measurement uncertainty (or noise) and provide a more accurate PDL estimation.

A 2×2 MIMO equalizer 252 models the link (or channel) impairment. The 2×2 MIMO Equalizer 252, which may be implemented as a 2×2 frequency domain (FD) MIMO equalizer or a 2×2 MIMO finite impulse response (FIR) filter. The coefficients (also referred to as filter taps) of the MIMO equalizer enables calculation of the SOP, and in turn enable calculation of a AGC PDL vector that may be summed with PDL vector estimated from MIMO equalizer coefficients (referred as MIMO PDL vector) to better estimate the system PDL. The disclosed 2×2 MIMO equalizer-based calibration may be integrated on real-time chips or in the calibration software for in-service calibration, without the need for additional optical or electrical devices.

In an optical system with two orthogonal polarizations, the system signal will have two orthogonal components X and Y. The optical channel through which a dual polarization signal $(E_x, E_y)^T$ travels may be mathematically modelled as a 2×2 matrix. The resulting received signal R may be expressed as follows:

$$\begin{pmatrix} R_X \\ R_Y \end{pmatrix} = \begin{bmatrix} a & b \\ c & d \end{bmatrix} \begin{pmatrix} E_X \\ E_Y \end{pmatrix} \quad \text{Equation (1)}$$

Due to impairments of the channels, such as polarization mode dispersion (PMD), PDL, and SOP rotation, there may induce coupling between $E_x$ and $E_y$ for the received $R_x$ and $R_y$ signals. This results in the improper signal recovery by the receiver. In order to counteract impairments of the optical channel, the receiver PDL monitoring module 250 implements a 2×2 MIMO equalizer 252 that best approximates an inverse of the channel impairment matrix as follows:

$$\begin{pmatrix} R_X \\ R_Y \end{pmatrix} = \begin{bmatrix} a & b \\ c & d \end{bmatrix} \begin{bmatrix} a & b \\ c & d \end{bmatrix}^{-1} \begin{pmatrix} E_X \\ E_Y \end{pmatrix} \quad \text{Equation (2)}$$

The coefficients of the 2×2 MIMO equalizer 252 can be adapted by various means, such as by periodically transmitting training symbols that allow computing the inverse channel function directly or data-decision based minimum mean square error algorithms. In some embodiments, the MIMO equalizer may be implemented in time domain using FIR filters, also referred to as a TDMIMO.

Figure 5:
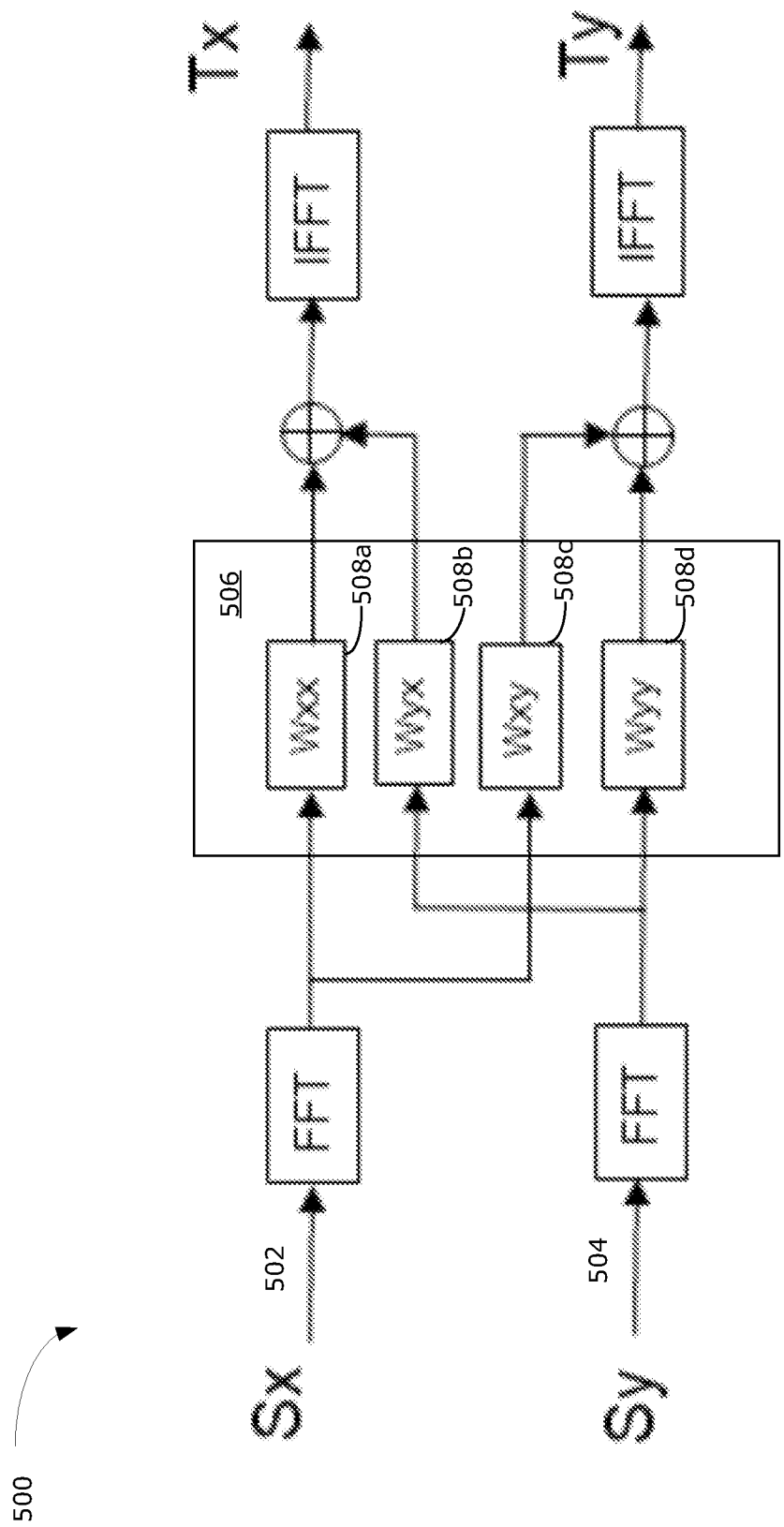
FIG. 5 illustrates a simplified block diagram demonstrating the principal of PDL compensation by a 2×2 FDMIMO.

FIG. 5 illustrates a simplified block diagram demonstrating the operating principal during PDL monitoring by an exemplary 2×2 FDMIMO equalizer 500. As shown, the X- and Y-polarizations of a signal, Sx 502 and Sy 504, respectively, after Fast Fourier Transformation (FFT), are then passed through a linear filter bank 506 comprising of four filters 508a, 508b, 508c, and 508d in a butterfly configuration to equalize all polarization effects. The X- and Y-polarization signals components are recovered through Inverse Fast Fourier Transformation (IFFT) as shown.

With a zero-forcing (ZF) assumption, the transfer matrix of the 2×2 FDMIMO equalizer 500 may be expressed as:

$$W = \begin{bmatrix} W_{XX} & W_{YX} \\ W_{XY} & W_{YY} \end{bmatrix}$$

Referring back to FIG. 4, the coefficients of the MIMO transfer matrix of 2×2 MIMO equalizer 252 may be stored in coefficient buffer 254. The transfer matrix coefficients are received by MIMO PDL vector calculator 256 as inputs, which normalizes the transfer matrix by the square root of its determinant in accordance with Equation (3):

$$W_{UE}(f) = \frac{W(f)}{\sqrt{\det(W(f))}} \quad \text{Equation (3)}$$

Where $W_{UE}(f)$ is the coefficient matrix as a function of a frequency offset f from the signal carrier frequency (or spectral DC in baseband), which is referred to as the normalized transfer matrix of the 2×2 MIMO equalizer 252. Based on the zero force (ZF) assumptions, the normalized transfer matrix in Equation (3) is the reserve rotation of the optical channel 120 and Equation (3) may be expressed as follows:

$$W_{UE} = H^{-1} = V \begin{pmatrix} 1 & 0 \\ 0 & e^{-\alpha} \end{pmatrix} U \quad \text{Equation (4)}$$

Where $H^{-1}$ denotes the ideal inverse channel transfer function $H^{-1}(f)$, and $\alpha$ is an attenuation coefficient related to the PDL (in dB scale) compensated by FDMIMO by $$PDL(dB) = \alpha \frac{20}{\ln 10},$$

V is a rotation matrix that characterizes the angle between signal SOP and the PDL axis, which may be derived through SVD method, U is a unitary matrix.

Since the $W_{UE}$ coefficient is a function of frequency (f), the $W_{UE}$ is evaluated by the 2×2 MIMO equalizer 252 at Direct Current (DC) (f=0) conditions to construct the PDL matrix to extract the PDL vector. Accordingly, Equation (3) is rewritten as:

$$W_T = \frac{W(0)}{\sqrt{\det(W(0))}} \quad \text{Equation (5)}$$

Where $$W(0) = \begin{bmatrix} W_{XX}(0) & W_{YX}(0) \\ W_{XY}(0) & W_{YY}(0) \end{bmatrix}$$

Wherein, $W_{(X1Y)(X1Y)}$ are coefficients read from the corresponding MIMO taps, W(0) stands for the coefficient at the DC frequency. Each MIMO coefficient may be a band of 2×2 matrix. For example, for a FFT size of 128, the corresponding W coefficient is a matrix of 2×2×128. The coefficients at the FFT BIN at the zero frequency (f=0) is used to estimate the PDL transfer function. The MIMO PDL vector calculator 256 then constructs a Hermitian matrix as:

$$M = W_T(W_T)^H = V \begin{pmatrix} 1 & 0 \\ 0 & e^{-2\alpha} \end{pmatrix} V^H \quad \text{Equation (6)}$$

Where $(\cdot)^H$ stands for the conjugate transpose operation of a matrix. Rather than determining the PDL based on eigenvalues of the Hermitian matrix M, which only provides a magnitude of the PDL value, the PDL transfer matrix is redefined as follows:

$$P = e^{-\alpha/2} \exp\left(\frac{\vec{\alpha}\vec{\sigma}}{2}\right) \qquad \text{Equation (7)}$$

Where $\vec{\alpha}$ is the PDL vector, which is a 3×1 vector in the Stokes Space, and $\vec{\sigma}$ is the Pauli vector. In essence, Equation (7) is a representation of the channel matrix that applies PDL to the optical signal. The PDL vector is defined as:

$$\vec{\alpha} = \alpha \vec{s} \qquad \text{Equation (8)}$$

Where $\alpha$ the amplitude of the PDL vector $\vec{\alpha}$ in Stokes space, which is the attenuation as defined in equation (4) and $\vec{s}$ is an unit vector in the Stokes space pointing to the direction of the maximum PDL transmission as converted from the SOP rotation matrix V extracted from the MIMO coefficients. Applying the logarithmic matrix operator $\log_m$ to the PDL matrix in Equation (6), a transfer matrix can be obtained:

$$B = \log_m\left[\frac{M}{2}\right] = \begin{bmatrix} B_{11} & B_{12} \\ B_{21} & B_{22} \end{bmatrix} \qquad \text{Equation (9)}$$

From Equations (6) to (9), the direction of the MIMO PDL vector a may be determined from the above matrix as follows:

$$\vec{\alpha} = [\alpha_1 \alpha_2 \alpha_3]^T \qquad \text{Equation (10)}$$

Where $\alpha_1 = \frac{B_{11} - B_{22}}{2}, \alpha_2 = \frac{B_{21} + B_{12}}{2}, \alpha_3 = \frac{B_{21} - B_{12}}{2j}$, with $j = \sqrt{-1}$.

It follows then the magnitude of the MIMO PDL vector in decibel scale (dB) is may be calculated as:

$$PDL(\text{dB}) = 20\log_{10}\left(e^{\sqrt{\alpha_1^2 + \alpha_2^2 + \alpha_3^2}}\right) \qquad \text{Equation (11)}$$

The MIMO PDL vector calculator 256 outputs the MIMO PDL vector, including a direction and a magnitude, to the PDL vector summation module 258.

The coefficients of the MIMO equalizer 252 stored in buffer 254 are also received by SOP rotation matrix calculator 260. The channel SOP rotation matrix may be extracted from the MIMO coefficients (also referred to as taps), and hence the direction of the AGC PDL vector could be calculated based on the SOP rotation vector. The channel SOP rotation matrix may be calculated using various suitable techniques, such as the singular value decomposition (SVD) method, among others. The matrix rotation operator can be obtained using various techniques, such as the Pauli decomposition method as described in "Polarization Optics in Telecommunications" by Jay D. Damask (2005), the contents of which are incorporated herein by reference. Therefore, the channel PDL may be derived as the vector sum of the PDL vectors of FDMIMO and AGC by $\vec{\alpha}_{Link} = \vec{\alpha}_{FDMIMO} + \vec{\alpha}_{AGC}$. According to the characteristics of PDL cascade, the PDL magnitude calculation may be simplified to be $|\vec{\alpha}_{link}| = \sqrt{|\vec{\alpha}_{FDMIMO}|^2 + |\vec{\alpha}_{AGC}|^2}$.

An AGC gain register 262, which may be implemented as part of AGC module 230, stores an AGC gain value of the received signal, and outputs the gain value onto AGC PDL vector calculator 264. Together with the SOP rotation matrix as determined by the SOP rotation matrix calculator 260, the AGC PDL vector calculator 264 determines an AGC PDL vector modelling the effects of AGC.

The effects of AGC is modelled with an AGC transfer function that is equivalent to a PDL element that is attempting to compensate for the power imbalance between the X- and Y-polarizations. In some embodiments, the PDL transfer function is characterized as follows:

$$PDL_{AGC} = \begin{bmatrix} 1 & 0 \\ 0 & \exp(-g) \end{bmatrix} \qquad \text{Equation (12)}$$

Where $g = g_x/g_y$ is the gain ratio between the X- and Y-polarizations (assuming $g_x < g_y$). Specifically, any measurement error that could be stemming from the responsivity difference among the four balanced receivers could be compensated by $$\begin{bmatrix} G'_{XI} \\ G'_{XQ} \\ G'_{YI} \\ G'_{YQ} \end{bmatrix} = \begin{bmatrix} \frac{1}{G_{0,XI}} & \square & \square & \square \\ \square & \frac{1}{G_{0,XQ}} & \square & \square \\ \square & \square & \frac{1}{G_{0,YI}} & \square \\ \square & \square & \square & \frac{1}{G_{0,YQ}} \end{bmatrix} \begin{bmatrix} G_{XI} \\ G_{XQ} \\ G_{YI} \\ G_{YQ} \end{bmatrix} \qquad \text{Equation (13)}$$

Where $G_{XI}$, $G_{XQ}$, $G_{YI}$, and $G_{YQ}$ are current AGC gain values read from ASIC registers; $G_{0,XI}$, $G_{0,XQ}$, $G_{0,YI}$, $G_{0,YQ}$ are AGC gain values from calibration at given receiver optical powers, measured at back-to-back configuration.

With reference to the transmitter axis, the rotated AGC PDL vector is calculated by AGC PDL vector calculator 264 as $$\vec{\alpha}_2 = \exp(\Psi \hat{r} \times) \vec{\alpha}_1 \qquad \text{Equation (14)}$$

Where $\vec{\alpha}_1$ is the AGC PDL vector converted from Equation (12) which is pointing to the receiver defined X- or Y-polarization direction as discussed above. The SOP rotation operator $\exp(\Psi \hat{r} \times)$ determines the rotation axis direction and angle applied to the AGC PDL vector. The rotation angle $\Psi$ represents the rotation angle around the rotation axis; the unit 3×1 vector $\hat{r}$ is derived from the SOP rotation matrix extracted from the DC components of the FDMIMO taps as shown in Equation (5) and (6).

Figure 6:
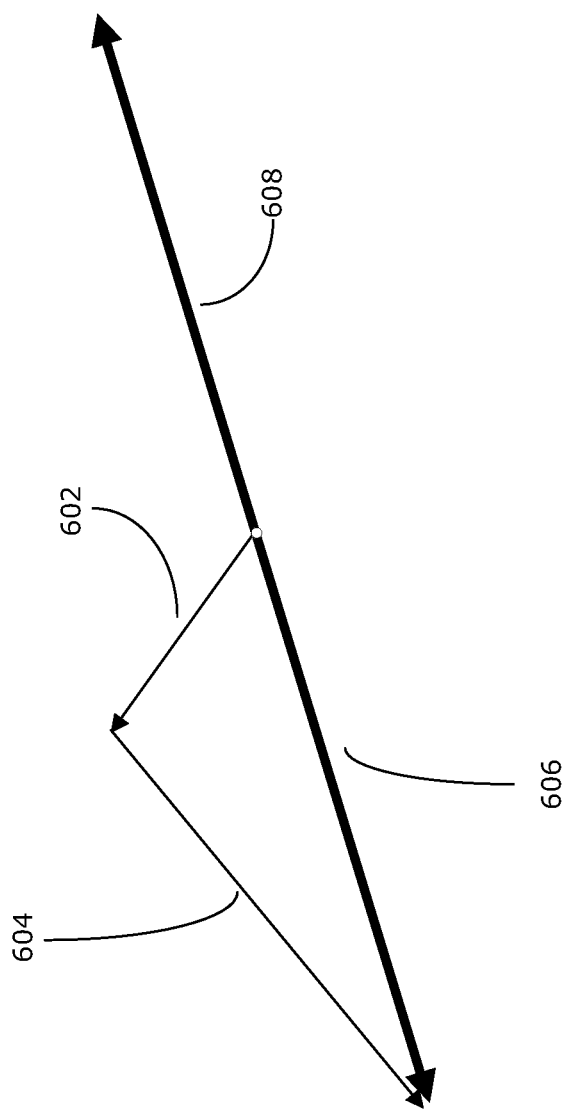
FIG. 6 illustrates a vector diagram showing the vector summation of the FDMIMO PDL vector and the AGC PDL vector to derive the PDL vector in accordance with the present disclosure.

The AGC PDL vector calculated by AGC PDL vector calculator 264 and the MIMO PDL vector from MIMO PDL vector calculator 256 are summed vectorially by PDL vector summation module 258 as conceptually shown in FIG. 6. As shown, by determining the AGC PDL vector 602, and summing it with the MIMO PDL vector 604, the resulting PDL vector 606 closely approximates the magnitude of PDL vector 608 but is opposite in vector direction, which may be stored by a PDL vector buffer 266 in FIG. 4.

Upon receiving the PDL vector from PDL vector buffer 266, the PDL calculator 268 calculates and reports the PDL value, such a vector equal in magnitude as PDL vector 606, but opposite in vector direction. In some embodiments, a PDL may be calculated from an averaged PDL vector in order to improve accuracy.

Figure 7:
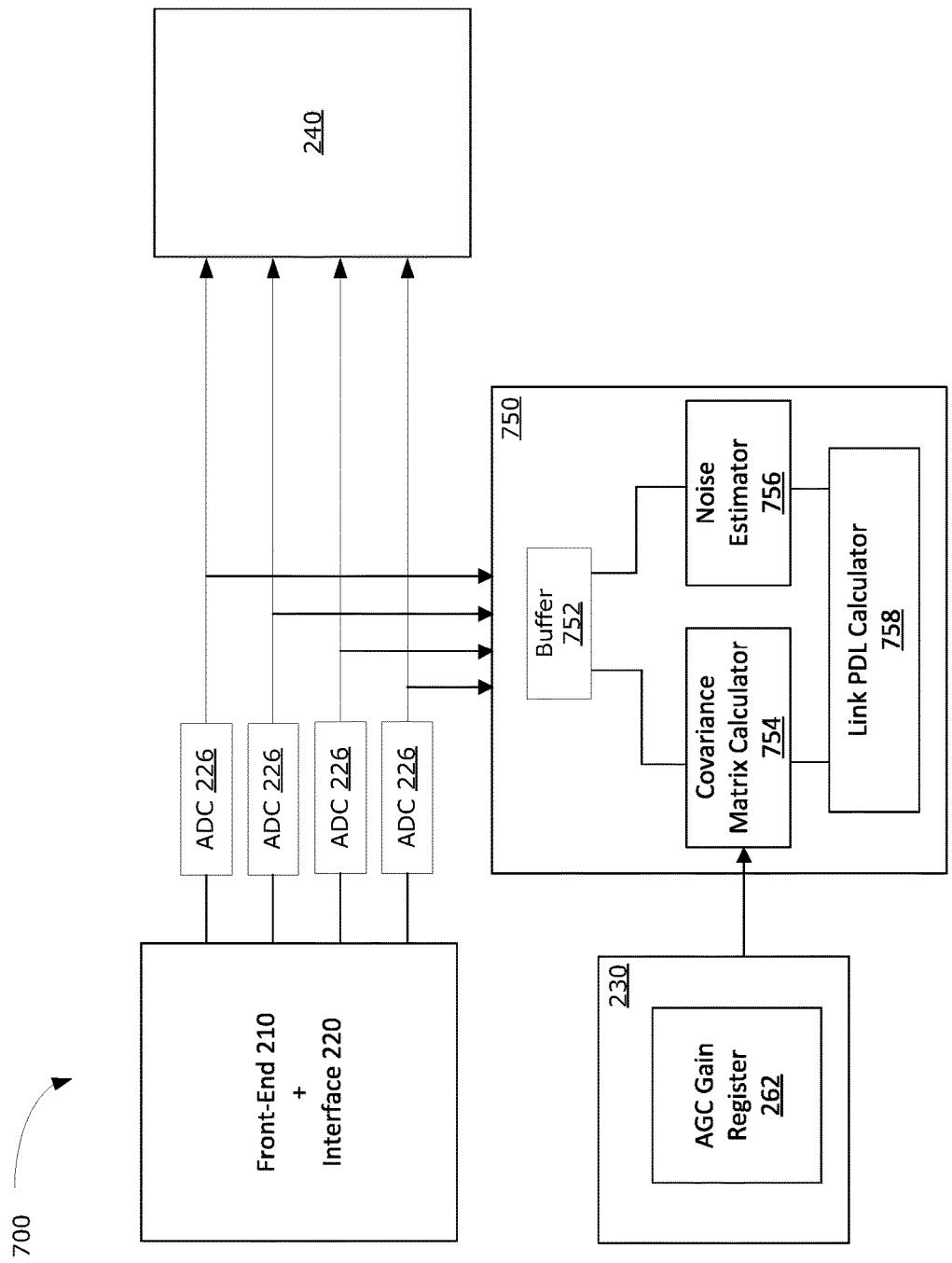
FIG. 7 is a block diagram illustrating some details of another example DSP in accordance with the present disclosure for estimating PDL using a covariance matrix estimation method with a correction of AGC gain and optical noise power.

FIG. 7 illustrates a partial block diagram of coherent receiver 700 that includes yet another exemplary embodiment of PDL monitoring module 750 in accordance with the present disclosure. Specifically, FIG. 7 shows PDL monitoring module 750 that implements a "covariance matrix AGC estimation" method, which may remove SOP dependency induced by AGC effects and enhance estimation reliability.

As shown, directly after coherent detection and prior to DSP 240, the received signals at the output of ADC's 226, at time t, are sampled by PDL monitoring module 750 and stored in buffer 752 in the form of $$E(t) = \begin{bmatrix} E_x(t) \\ E_y(t) \end{bmatrix} \quad \text{Equation (14)}$$

Where each of $E_x$ and $E_y$ include their respective I and Q components. The sampled received signals from buffer 752 are passed to a covariance matrix calculator 754 to determine a covariance matrix of the received signal having been compensated for AGC gain effects. The AGC gain effect can be compensated by, for example, multiplexing the reversed AGC transfer function by taking the inverse of the transfer function of the AGC gain applied to the received signal as follows:

$$\begin{bmatrix} A_x(t) \\ A_y(t) \end{bmatrix} = \begin{bmatrix} 1 & 0 \\ 0 & g_x/g_y \end{bmatrix} \begin{bmatrix} E_x(t) \\ E_y(t) \end{bmatrix} \quad \text{Equation (15)}$$

Where $E_x(t)$ is the received complex signal in the X-polarization, $E_y(t)$ is the received complex signal in the Y-polarization, and $g_x/g_y$ differential gain between two polarization modes at receiver. To balance the power difference between the X- and Y-polarizations, an AGC gain matrix derived based on values retrieved from AGC gain register 262 may then be applied to the received signal by calculating the AGC covariance matrix C with ASE noise power correction as follows:

$$C = \begin{bmatrix} \langle A_x A_x^* \rangle & \langle A_x A_y^* \rangle \\ \langle A_y A_x^* \rangle & \langle A_y A_y^* \rangle \end{bmatrix} - \begin{bmatrix} \sigma^2 & 0 \\ 0 & \sigma^2 \end{bmatrix} \quad \text{Equation (16)}$$

Where $\sigma^2$ is the ASE noise power estimated from noise power estimator 756. The noise power estimator 756 may calculate the OSNR from the ratio between the noise variance and signal power by any suitable method, such as those disclosed in U.S. Pat. No. 10,256,901 entitled "System and Methods for Optical Signal-to-Noise Ratio Monitoring", the disclosure of which is incorporated herein in its entirety. It is understood that the ASE noise power could be ignored at high OSNR values.

The PDL calculator 758 may calculate the PDL from the Eigen values of covariance matrix C in Equation (16). For example, the Eigen values of matrix C may be determined using Eigen value decomposition method to calculate the two Eigen values of the matrix C, and the PDL is determined as the ratio between the two Eigen values.

The above described calculations may be performed by another processing device external to the DSP 240, to calibrate the transceiver for the PDL. For example, such calculations may be performed during calibration, and the estimated PDL at the receiver may be compensated in the transmitter DSP and in the receiver DSP, respectively (e.g., by adjusting reserved system margins).

In some examples, the DSP 240 may be implemented using real-time ASIC-DSP, for real-time estimation of PDL and corresponding adjustment of system margins.

Figure 8:
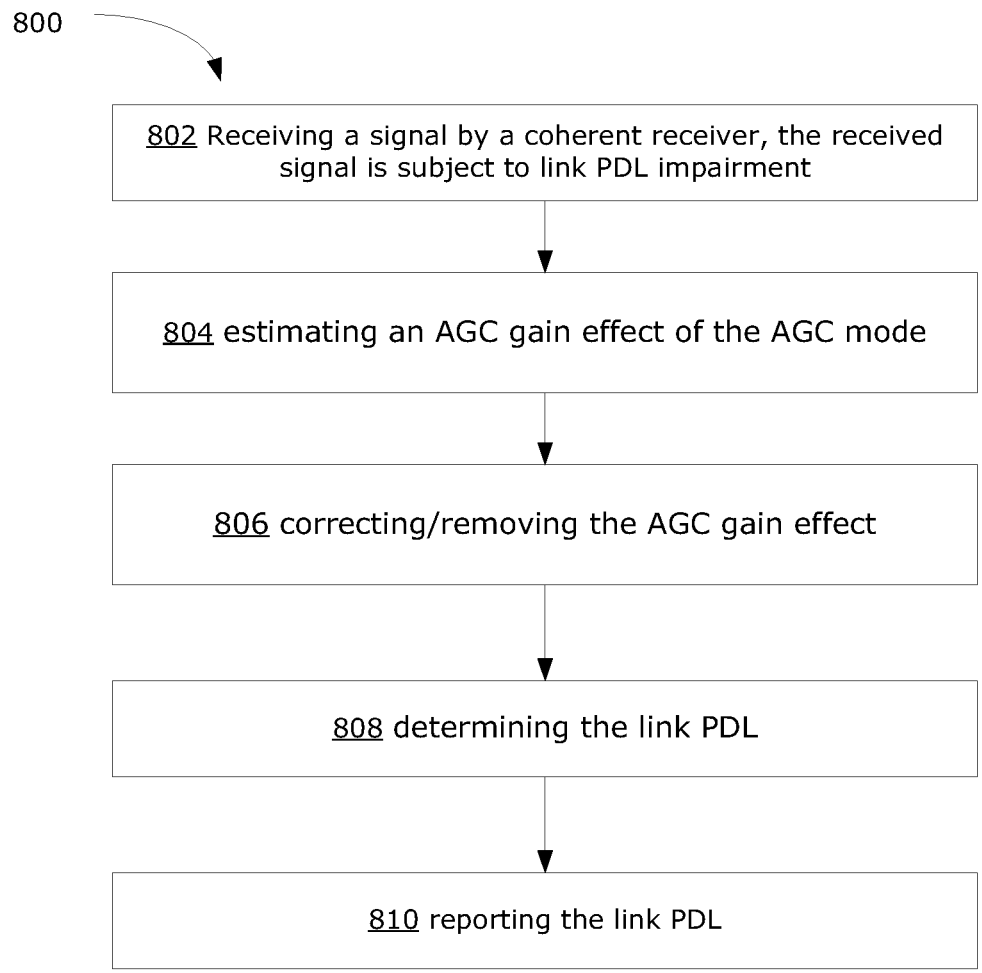
FIG. 8 is a flow chart illustrating an example method for estimating and reporting PDL in a coherent transceiver in accordance with the present disclosure.

FIG. 8 is a flowchart illustrating an example method 800 for estimating system PDL in a coherent transceiver in accordance with the present disclosure. In some examples, a processing unit external to the DSP 240 may also be used to perform some steps of the method 800. The method 800 may be used for factory calibration, remote calibration, self-calibration and/or in-serving monitoring, as discussed herein. For example, after the transceiver has been deployed for use, the method 800 may be implemented by the transceiver itself (e.g., using the DSP 240 together with a processor of the transceiver) to monitor its own impairment and possibly adjust reserved system margin in response. In a coherent transceiver, the transmitter and receiver are implemented at the same module, thus enabling the self-calibration is possible.

At 802, a measured signal is obtained at the coherent receiver operating in AGC mode. For in-service applications, the measured signal is a digital electrical signal that is the result of detecting and converting an optical signal (corresponding to a known electrical reference signal from a transmitter) received by the receiver over an optical channel. Generally, the measured signal is a four-channel signal, $R_{XI}$, $R_{XQ}$, $R_{YI}$, $R_{YQ}$, having the information of the transmitted XI, XQ, YI and YQ channels and subjected to channel impairments including PDL as well as AGC gain effects.

At 804, a PDL monitoring module estimates the AGC gain effects from the received signal.

In some embodiments, step 804 may be implemented using a "PDL vector summation" method. An Amplifier Gain Control (AGC) PDL vector is calculated based on the AGC gain obtained from the ASIC register. A transfer function of the signal gain as a result of AGC effects is determined and normalized. A SOP rotation matrix may be determined by evaluating the normalized transfer matrix at DC conditions. A vector direction, including a vector angle and a rotation vector of between the AGC PDL vector and the MIMO PDL vector, may be calculated from the SOP rotation matrix. The channel SOP rotation matrix may be calculated using various suitable techniques, such as calculating coefficients of the channel SOP rotation matrix using the singular value decomposition (SVD) method, among others.

In some further embodiments, a covariance matrix AGC estimation method may be implemented at 804. The method estimates the AGC gain by sampling the received signal prior to DSP module 240. Then, AGC gain values may be retrieved from the sampled signal values. An AGC gain matrix may be formed from the AGC gain values, and an AGC transfer matrix is determined from the AGC gain matrix.

At 806, the AGC gain effect is removed/corrected from the received signal.

In embodiments employing the PDL vector summation method, the AGC gain effects can be compensated for by vectorially summing a MIMO PDL vector and the AGC PDL vector determined at 804. To determine the MIMO PDL vector, a transfer matrix of a MIMO equalizer, such as a FDMIMO or TDMIMO, that models the optical communication link impairments, including PDL, is determined from the taps of the MIMO equalizer. The MIMO taps, or the coefficients of its transfer matrix, can be adapted by various means, such as by periodically transmitting training symbols that allow computing the inverse channel function directly. A corresponding Hermitian matrix of the MIMO transfer matrix is obtained from the MIMO coefficients. The PDL transfer matrix of the MIMO equalizer is redefined in a form in accordance with Equation (7), namely $$P = e^{-\alpha/2} \exp\left(\frac{\vec{\alpha}\vec{\sigma}}{2}\right),$$

where $\vec{\alpha}$ is a PDL vector defined as $\vec{\alpha} = \alpha \vec{s}$, $\alpha$ is the differential attenuation at polarization modes (polarization directions at maximum and minimum transmittance), which is related to the PDL value in dB by PDL=20 $\log_{10}(\exp(\alpha))$, $\vec{s}$ is an unit vector in Stokes space pointing in a direction of maximum PDL transmission, $\vec{\sigma}$ is a Pauli vector. The PDL vector, including a magnitude and a vector direction in Stokes space, is calculated from the Hermitian matrix as defined in Equation (6), using the matrix operations as described in Equations (7), (9) and (10).

In embodiments employing the covariance matrix method, the AGC gain effect can be compensated by the PDL monitoring module multiplexing a reversed AGC transfer function determined at 804 with the sampled signal. A covariance matrix may be calculated by applying the AGC gain matrix to the received signal. The ASE noise power is removed from the covariance matrix by subtracting an ASE noise variance therefrom, resulting in a covariance matrix without noise and accounting for AGC gain effects.

At 808, the PDL is determined. In the vector summation method, the PDL is a PDL vector equal in magnitude but opposite in vector direction as the summed vector of the MIMO PDL vector and the AGC PDL vector at step 806.

In the covariance matrix methods, the PDL may be determined from the Eigen values of the covariance matrix without noise determined from step 806.

At 810, the determined PDL may be reported for transceiver or communication system management purposes. For example, the PDL may be stored so that PDL may be evaluated over a period of time so that a suitable system margin may be selected to maximize transmission efficiency while being capable of handling PDL and minimize transmission failures. As a further example, the PDL may be reported to system margin reservation modules so that the system margin reservation may be adjusted in real-time to counter PDL.

Figure 9:
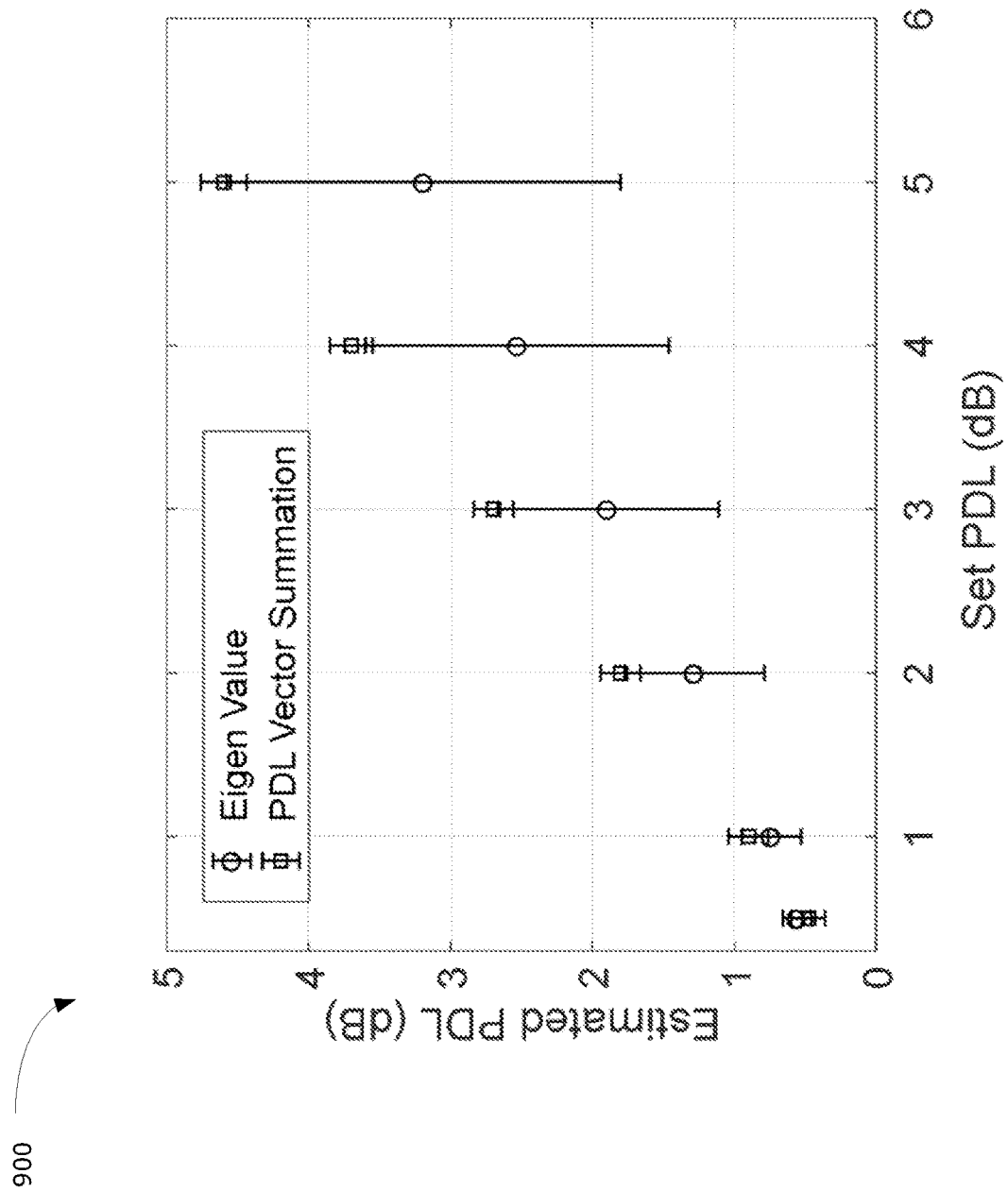
FIG. 9 illustrates a graph of estimation accuracy and channel SOP rotation sensitivity in the estimated link PDL in accordance with the present disclosure compared to one prior art method.

FIG. 9 illustrates a graph of estimated PDL and corresponding channel SOP rotation sensitivity in accordance with the PDL vector summation method described herein compared to Eigen value based prior art method. The estimated PDL values are shown in data points and the channel SOP rotation sensitivities are shown as vertical bars for each estimation. As may be observed from FIG. 9, the PDL estimated by the methods of the present disclosure exhibits more accurate estimation with less channel SOP rotation sensitivity.

In various examples, interleaving (e.g., by FEC encoder) may also be performed to reduce errors over the plurality of units of the signal over the wavelength.

In some applications, the example disclosed receiver may operate with the disclosed transmitter in a pair and may be synchronized with the disclosed transmitter. The disclosed receiver may apply a defined de-rotating sequence to perform de-rotation. The defined de-rotating sequence may be pre-defined in a standard or be indicated in a signal that is transmitted by the disclosed transmitter. Synchronizing the example disclosed transmitter with the optical receiver may enable the receiver to recover payload information from the transmitted signal with greater accuracy.

The example disclosed transmitter and receiver may be used in electronic devices, such as base stations, for example in optical telecommunication system, to boost system performance in optical networks. Furthermore, the disclosed optical transmitter and receiver may be implemented with little or no negative impact on efficiency and power consumption of the device.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., an onboard processor, a personal computer, a server, or a network device) to execute examples of the methods disclosed herein.

Certain adaptations and modifications of the described embodiments can be made. Therefore, the above discussed embodiments are considered to be illustrative and not restrictive. Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A method of monitoring a polarization dependent loss (PDL) of a signal during transmission through an optical communication link, the method comprising:
   receiving the signal by a coherent receiver, the received signal being subjected to one or more impairments in Amplifier Gain Control (AGC) mode, the one or more impairments including PDL;
   estimating an AGC gain effect of the AGC mode;
   compensating for the AGC gain effect in the received signal;
   determining the PDL from the compensated signal; and
   reporting the PDL.

2. The method of claim 1, wherein the estimating further comprises:
    determining an AGC PDL vector from the received signal;
    determining a multiple input multiple output (MIMO) PDL vector from a MIMO equalizer that models the one or more impairments of the optical communication link from the received signal; and
    vectorially summing the AGC PDL vector and the MIMO PDL vector to derive a PDL vector.

3. The method of claim 2, wherein the determining the PDL further comprises:
    calculating the PDL as a vector equal in magnitude but opposite in vector direction to the derived PDL vector.

4. The method of claim 2, wherein the determining the MIMO PDL vector further comprises:
    determining a PDL transfer matrix of the MIMO equalizer;
    redefining the PDL transfer matrix in the form of $$P = e^{-\alpha/2} \exp\left(\frac{\vec{\alpha}\vec{\sigma}}{2}\right),$$

where $\vec{\alpha}$ is a PDL vector defined as $\vec{\alpha} = \alpha \vec{s}$, $\alpha$ is a vector amplitude indicative of differential attenuation between polarization modes at minimum and maximum transmittance, $\vec{s}$ is an unit vector in Stokes space pointing in a direction of maximum PDL transmission, and $\vec{\sigma}$ is a Pauli vector; and
    calculating a direction and magnitude of the MIMO PDL vector from a Hermitian matrix of the PDL transfer matrix.

5. The method of claim 2, wherein the determining of the AGC PDL vector further comprises:
    determining an AGC transfer function of a signal gain of the received signal;
    determining a channel state of polarization (SOP) rotation matrix from the AGC transfer matrix of the MIMO equalizer;
    calculating a magnitude of the AGC PDL vector from Eigen values of the AGC transfer matrix; and
    calculating a direction of the AGC PDL vector from the channel SOP rotation matrix.

6. The method of claim 5, wherein the determining of the channel SOP rotation matrix further comprises:
    calculating the channel SOP rotation matrix coefficients by performing singular value decomposition (SVD) method on MIMO coefficients of the MIMO equalizer.

7. The method of claim 1, further comprising:
    adjusting a reserved system margin in response to the reported PDL.

8. The method of claim 4, wherein the calculating further comprises:
    extracting the PDL transfer matrix of the MIMO equalizer coefficients;
    evaluating the normalized transfer matrix at direct current (DC) conditions; and
    converting the evaluated normalized DC transfer matrix to a Hermitian matrix as:

$$M = W_{UE}(W_{UE})^H = V \begin{pmatrix} 1 & 0 \\ 0 & e^{-2\alpha} \end{pmatrix} V^H$$

where $W_{UE}$ is the normalized transfer function, $(W_{UE})^H$ is its conjugate matrix, V is a rotation matrix that characterizes polarization rotation between the received signal and the PDL axis, $\alpha$ is the differential attenuation at polarization modes (polarization direction corresponding to maximum and minimum transmittance) related to the MIMO PDL value in dB scale by $$PDL = \alpha \frac{20}{\ln 10},$$

and $V^H$ is the conjugate matrix of V.

9. The method of claim 5, further comprising:
    applying a logarithmic matrix operator to the PDL vector in Stokes space as:

$$B = \log_m\left[\frac{M}{2}\right] = \begin{bmatrix} B_{11} & B_{12} \\ B_{21} & B_{22} \end{bmatrix},$$

where $B_{11}$, $B_{12}$, $B_{21}$, and $B_{22}$ are coefficients of the Stokes space matrix; and
    determining the vector direction of the PDL AGC vector as $$\vec{\alpha} = [\alpha_1 \; \alpha_2 \; \alpha_3]^T$$

where $\alpha_1 = \frac{B_{11} - B_{22}}{2}$, $\alpha_2 = \frac{B_{21} + B_{12}}{2}$, $\alpha_3 = \frac{B_{21} - B_{12}}{2j}$, with $j = \sqrt{-1}$.

10. The method of claim 9, wherein the determining the PDL (in dB scale) from the magnitude of the AGC PDL vector as:

$$PDL(dB) = 20\log_{10}\left(e^{\sqrt{\alpha_1^2 + \alpha_2^2 + \alpha_3^2}}\right).$$

11. The method of claim 4, wherein $\alpha$ is related to the PDL value in dB by $$PDL(dB) = \alpha \frac{20}{\ln 10}.$$

12. The method of claim 1, wherein the estimating of the AGC gain effect further comprises:
    sampling the received signal prior to a digital signal processing (DSP) unit;
    retrieving AGC gain values from the sampled signal;
    determining an AGC gain matrix from the AGC gain values; and
    determining an AGC transfer function from the AGC gain matrix.

13. The method of claim 12, wherein the compensating further comprises:
    determining a signal matrix by multiplexing an inverse of the AGC transfer function to the sampled received signal; and
    calculating a covariance matrix by subtracting an amplified spontaneous emission (ASE) noise variance from the signal matrix.

14. The method of claim 13, wherein the determining the PDL further comprises:

determining a PDL value from Eigen values of the covariance matrix.

15. The method of claim 13, further comprising:
calculating an Optical Signal Noise Ratio (OSNR) from a ratio between the ASE noise variance and the received signal variance.

16. A coherent receiver configured to monitor a polarization dependent loss (PDL) of a signal during transmission through an optical communication link, the coherent receiver comprising:
a front end portion for receiving the signal, the received signal being subjected to one or more impairments in Amplifier Gain Control (AGC) mode, the one or more impairments including PDL;
one or more hardware processing circuits configured to:
estimate an AGC gain effect of the received signal,
compensate for the AGC gain effect the received signal, and
determine the PDL from the compensated signal; and
reporting the PDL.

17. The coherent receiver of claim 16, wherein the one or more hardware processing circuits are configured to estimate the estimate an AGC gain effect of the received signal by:
determining an AGC PDL vector from the received signal;
determining a multiple input multiple output (MIMO) PDL vector from a MIMO equalizer that models the one or more impairments of the optical communication link from the received signal; and
vectorially summing the AGC PDL vector and the MIMO PDL vector to derive a PDL vector;
wherein the one or more hardware processing circuits are configured to determine the PDL from the compensated signal by calculating the PDL as a vector equal in magnitude but opposite in vector direction to the derived PDL vector;
wherein the one or more hardware processing circuits are configured to the determine the MIMO PDL vector by:
determining a PDL transfer matrix of a MIMO equalizer that models the one or more impairments of the optical communication link;
redefining a PDL transfer matrix form of $$P = e^{-\alpha/2} \exp\left(\frac{\vec{\alpha}\vec{\sigma}}{2}\right),$$

where $\vec{\alpha}$ is a PDL vector defined as $\vec{\alpha} = \alpha \vec{s}$, $\alpha$ is the vector amplitude indicative of a differential attenuation between polarization modes at minimum and maximum transmittance, $\vec{s}$ is an unit vector in Stokes space pointing in a direction of maximum PDL transmission, and $\vec{\sigma}$ is a Pauli vector; and
calculating a direction and magnitude of a MIMO PDL vector from a Hermitian matrix of the PDL transfer matrix.

18. The coherent receiver of claim 17, wherein the one or more hardware processing circuits are configured to calculate a state of polarization rotation matrix by performing singular value decomposition (SVD) method on MIMO coefficients of the MIMO equalizer.

19. The coherent receiver of claim 16, wherein the MIMO is one of a finite impulse response (FIR) filter bank configured in a butterfly configuration, a 2×2 frequency domain (FD) MIMO, and a 2×2 time domain (TD) MIMO.

20. The coherent receiver of claim 16, wherein the one or more hardware processing circuits are configured to:
calculate the covariance matrix from the received signal, and construct a AGC transfer matrix from the AGC gain register;
compensate the AGC effect by multiplying the AGC gain matrix to the covariance matrix of the received data;
determine a variance of a channel noise; the noise variance is subtracted from the covariance matrix to remove the impact of ASE noise power on the PDL estimation accuracy; and
calculate the PDL from Eigen values of a resulting covariance matrix derived from removing the channel noise from a AGC covariance matrix.

* * * * *